United States Patent
Liu et al.

(10) Patent No.: US 10,962,092 B2
(45) Date of Patent: Mar. 30, 2021

(54) TENSIONER AND METHOD

(71) Applicant: GATES CORPORATION, Denver, CO (US)

(72) Inventors: Keming Liu, Sterling Heights, MI (US); Min Chun Hao, Suzhou (CN); Jin Zhan, Suzhou (CN); Enrico Wick, Stolberg (DE); Arnaud Martinez, Nuth (NL); Francesco Bassi, Turin (IT)

(73) Assignee: GATES CORPORATION, Denver, CO (US)

( * ) Notice: Subject to any disclaimer, the term of this patent is extended or adjusted under 35 U.S.C. 154(b) by 381 days.

(21) Appl. No.: 15/699,859

(22) Filed: Sep. 8, 2017

(65) Prior Publication Data

US 2019/0078667 A1  Mar. 14, 2019

(51) Int. Cl.
*F16H 7/08* (2006.01)
*F16H 7/12* (2006.01)
(Continued)

(52) U.S. Cl.
CPC ............. *F16H 7/0829* (2013.01); *F16H 7/10* (2013.01); *F16H 7/1218* (2013.01);
(Continued)

(58) Field of Classification Search
CPC . F16H 7/08; F16H 7/0829; F16H 7/10; F16H 2007/081; F16H 2007/0865;
(Continued)

(56) References Cited

U.S. PATENT DOCUMENTS 315,735 A    4/1885  Colburn
611,160 A    9/1898  Whipple
(Continued)

FOREIGN PATENT DOCUMENTS

DE         508156 C      9/1930
DE       19631507 A1     2/1998
(Continued)

OTHER PUBLICATIONS

DE102013213127(A1)_Translation; Accessory Belt Drive of an Internal Combustion Engine; Published: Jan. 8, 2015; European Patent Office (Year: 2015).*
(Continued)

*Primary Examiner* — Michael R Mansen
*Assistant Examiner* — Raveen J Dias
(74) *Attorney, Agent, or Firm* — Alyssa K. Sandrowitz, Esq.

(57) ABSTRACT

A tensioner comprising a base defining a hole, the hole having a center C, the hole having a diameter sufficient to receive a driven pulley, a rotary arm engaged with the base by a retaining member connected to the base, the rotary arm rotatable about the center C, a pivot arm mounted to the rotary arm on a pivot, the pivot offset from center C, a first pulley journalled to the rotary arm, a second pulley journalled to the pivot arm, a torsion spring engaged between the rotary arm and the pivot arm for biasing the second pulley toward the first pulley, a damping member frictionally engaged between the base and the rotary arm, and the rotary arm defining a portion for receiving a first pulley fastener whereby a first pulley position is adjustable.

6 Claims, 7 Drawing Sheets

(51) Int. Cl.
*F16H 7/10* (2006.01)
*F16H 7/18* (2006.01)
*F16H 7/24* (2006.01)

(52) U.S. Cl.
CPC ............ *F16H 7/1281* (2013.01); *F16H 7/18* (2013.01); *F16H 7/24* (2013.01); *F16H 2007/081* (2013.01); *F16H 2007/0842* (2013.01); *F16H 2007/0865* (2013.01); *F16H 2007/0874* (2013.01); *F16H 2007/0893* (2013.01); *F16H 2007/0897* (2013.01)

(58) Field of Classification Search
CPC ..... F16H 2007/0874; F16H 2007/0893; F16H 7/1209; F16H 7/1218; F16H 7/1281; F16H 7/0827; F16H 7/12
See application file for complete search history.

(56) References Cited

U.S. PATENT DOCUMENTS

| | | | |
|---|---|---|---|
| 976,115 A | 11/1910 | Bard | |
| 1,433,958 A | 10/1922 | Laughton | |
| 1,805,326 A | 5/1931 | Bunker et al. | |
| 2,954,726 A | 10/1960 | Kerridge | |
| 4,564,098 A | 1/1986 | Hormann | |
| 4,758,208 A | 7/1988 | Bartos et al. | |
| 4,981,116 A | 1/1991 | Trinquard | |
| 5,221,236 A | 6/1993 | Raymer et al. | |
| 5,725,450 A | 3/1998 | Huskey | |
| 5,776,025 A | 7/1998 | Labudde et al. | |
| 6,117,034 A | 9/2000 | Vine | |
| 6,511,393 B1 | 1/2003 | Bogl et al. | |
| 6,609,989 B2 | 8/2003 | Bogner et al. | |
| 6,648,783 B1 | 11/2003 | Bogner | |
| 6,689,001 B2 | 2/2004 | Oliver et al. | |
| 6,736,743 B2 | 5/2004 | Fletcher et al. | |
| 6,830,524 B2 | 12/2004 | Tamai | |
| 6,857,978 B2 | 2/2005 | Polster et al. | |
| 6,960,145 B2 | 11/2005 | Fraley, Jr. et al. | |
| 7,285,065 B2 | 10/2007 | Dinca et al. | |
| 7,468,013 B2 | 12/2008 | Di Giacomo et al. | |
| 7,494,434 B2 | 2/2009 | Mc Vicar et al. | |
| 7,530,911 B2 | 5/2009 | Serkh | |
| 7,892,125 B2 | 2/2011 | Nelson et al. | |
| 7,901,310 B2 | 3/2011 | Lolli et al. | |
| 8,092,328 B2 | 1/2012 | Dec et al. | |
| 8,353,795 B2 | 1/2013 | Montani et al. | |
| 8,439,780 B2 | 5/2013 | Ruffini et al. | |
| 8,821,328 B2 | 9/2014 | Jud et al. | |
| 8,821,382 B2 | 9/2014 | Kagawa | |
| 9,239,097 B2* | 1/2016 | Lescorail | F16H 7/12 |
| 9,341,243 B2* | 5/2016 | Replete | F16H 7/1218 |
| 9,625,013 B2 | 4/2017 | Wolf et al. | |
| 9,709,137 B2 | 7/2017 | Walter | |
| 2002/0039943 A1 | 4/2002 | Serkh | |
| 2002/0039944 A1* | 4/2002 | Ali | F16H 7/1209 |
| | | | 474/135 |
| 2002/0086751 A1 | 7/2002 | Bogner et al. | |
| 2003/0109342 A1 | 6/2003 | Oliver et al. | |
| 2003/0153420 A1 | 8/2003 | Rogers | |
| 2003/0153421 A1 | 8/2003 | Liu | |
| 2003/0176223 A1 | 9/2003 | Polster et al. | |
| 2003/0216203 A1 | 11/2003 | Oliver et al. | |
| 2003/0220164 A1 | 11/2003 | Tamai | |
| 2004/0002401 A1 | 1/2004 | Iverson | |
| 2004/0043854 A1 | 3/2004 | Fraley, Jr. et al. | |
| 2004/0072642 A1 | 4/2004 | Serkh | |
| 2004/0077446 A1 | 4/2004 | Manning | |
| 2004/0087401 A1 | 5/2004 | Serkh | |
| 2005/0096168 A1 | 5/2005 | Serkh et al. | |
| 2005/0181901 A1 | 8/2005 | Shin et al. | |
| 2006/0068957 A1* | 3/2006 | Stone | F16H 7/1281 |
| | | | 474/135 |
| 2006/0100051 A1 | 5/2006 | Di Giacomo et al. | |
| 2006/0217222 A1 | 9/2006 | Lolli et al. | |
| 2006/0217223 A1* | 9/2006 | Schmid | F16H 7/1263 |
| | | | 474/136 |
| 2006/0287146 A1 | 12/2006 | McVicar et al. | |
| 2007/0037648 A1 | 2/2007 | Di Giacomo et al. | |
| 2008/0171622 A1* | 7/2008 | Schever | F16F 1/042 |
| | | | 474/135 |
| 2008/0214342 A1 | 9/2008 | Montani et al. | |
| 2008/0220919 A1 | 9/2008 | Antchak et al. | |
| 2010/0144473 A1 | 6/2010 | Ward et al. | |
| 2011/0312454 A1* | 12/2011 | Comsa | F01L 1/02 |
| | | | 474/110 |
| 2012/0316018 A1* | 12/2012 | Ward | F16H 7/1218 |
| | | | 474/135 |
| 2012/0318589 A1 | 12/2012 | Staley et al. | |
| 2013/0040770 A1* | 2/2013 | Wolf | F16H 7/1281 |
| | | | 474/134 |
| 2013/0079185 A1 | 3/2013 | Schauerte et al. | |
| 2013/0095967 A1* | 4/2013 | Wolf | F16H 7/1281 |
| | | | 474/135 |
| 2013/0165284 A1* | 6/2013 | Mennerat | F16H 7/1281 |
| | | | 474/112 |
| 2013/0203535 A1 | 8/2013 | Mack et al. | |
| 2013/0260932 A1 | 10/2013 | Adam et al. | |
| 2014/0256488 A1* | 9/2014 | Wolf | F16H 7/1281 |
| | | | 474/135 |
| 2014/0315673 A1* | 10/2014 | Zacker | F16H 7/1218 |
| | | | 474/135 |
| 2014/0342862 A1 | 11/2014 | Wolf et al. | |
| 2015/0011345 A1* | 1/2015 | Lescorail | F16H 7/1281 |
| | | | 474/136 |
| 2015/0247558 A1* | 9/2015 | Hamers | F16H 7/1218 |
| | | | 474/117 |
| 2015/0308545 A1* | 10/2015 | Harvey | F16H 7/1218 |
| | | | 474/117 |
| 2015/0369346 A1* | 12/2015 | Sisodia | F16H 7/1209 |
| | | | 474/135 |
| 2015/0369347 A1* | 12/2015 | Wolf | F16H 7/1281 |
| | | | 474/134 |
| 2017/0037940 A1* | 2/2017 | Serkh | F16H 7/1281 |
| 2017/0146100 A1* | 5/2017 | Walter | F02B 67/06 |
| 2017/0219068 A1* | 8/2017 | Tronquoy | F16H 7/1281 |
| 2018/0172117 A1* | 6/2018 | Arneth | F02B 67/06 |
| 2019/0017579 A1* | 1/2019 | Stadermann | F16H 7/1281 |

FOREIGN PATENT DOCUMENTS

| | | | |
|---|---|---|---|
| DE | 10044645 A1 | 3/2002 | |
| DE | 102011085122 A1 | 4/2013 | |
| DE | 102013213127 A1 | 1/2015 | |
| DE | 102015211227 A1 | 12/2016 | |
| EP | 2128489 B1 | 8/2011 | |
| EP | 2385272 A1 | 11/2011 | |
| JP | 3028551 A | 2/1991 | |
| WO | 2014100894 A1 | 7/2014 | |
| WO | WO-2018178143 A1 * | 10/2018 | ............... F16H 7/10 |

OTHER PUBLICATIONS

WO2018178143(A1) Translation; Jud et al; Clamping Device Having Adjustment Mechanism and Method for Adjusting the Torque of the Clamping Device; Published: Apr. 10, 2018; Filed: Mar. 31, 207; Espacenet (Year: 2017).*
European Patent Office, International Search Report PCT/US2014/058870, dated Jan. 30, 2015.
European Patent Office, Invitation to Pay Additional Fees and, Where Applicable, Protest Fee, International application No. PCT/US2018/049501, dated Oct. 29, 2018.
European Patent Office, International Search Report and Written Opinion of the International Searching Authority, International application No. PCT/US2018/049501, dated Jan. 2, 2019.

* cited by examiner

TENSIONER AND METHOD

FIELD OF THE INVENTION

The invention relates to a tensioner, and more particularly, to a tensioner having a rotary arm defining a portion for receiving a first pulley fastener whereby a first pulley position is adjustable.

BACKGROUND OF THE INVENTION

A multi-ribbed belt is commonly used on automotive vehicles to transmit power between the engine crankshaft and accessory components. On a conventional drive, engine crankshaft pulley drives accessories via one belt or multi belts. A tensioner is usually used when multi accessories are driven via a belt. Even when the tensioner arm is positioned properly, belt installation tension can change slightly with respect to length tolerance of the belt.

Motor-generator units (MGU) are used to implement BSG (belt starter-generator) engine start-stop, torque assist to boost engine acceleration and recuperation to generate electricity in addition to normal generation by an alternator. Significant fuel savings and reduction of exhaust can be achieved by using BSG technology.

To control tension in two different driving modes, namely, MGU driving and MGU generating with engine driving, an orbital style tensioner was developed. The tensioner typically has a rotary arm and a pivot arm connected by one spring. The tensioner is mounted to the MGU. This form of tensioner can control belt operation tension in both modes: motoring and generating. However, unlike a conventional single arm tensioner, it is not practical to position the orbital tensioner arms in an optimized way to reduce tension variation. Installation tension changes due to belt length tolerances, and pulley position and size, can be significantly higher than for a single arm tensioner. Belt tension is an important factor determining friction loss or power loss of a belt drive and so it is desirable to lower belt tension without sacrificing system functional performance.

Representative of the art is U.S. Pat. No. 9,709,137 which discloses a tensioner for tensioning an endless drive member that is engaged with a rotary drive member on a shaft of a motive device. The tensioner includes a base that is mountable to the motive device, a ring that is rotatably supported by the base in surrounding relationship with the shaft of the motive device and which is rotatable about a ring axis, a tensioner arm pivotally mounted to the ring for pivotal movement about an arm pivot axis, and first and second tensioner pulleys. The first tensioner pulley is rotatably mounted to the tensioner arm. The tensioner arm is biased towards a first span of the endless drive member on one side of the rotary drive member. The second tensioner pulley is rotatably mounted at least indirectly to the ring and is biased towards a second span of the endless drive member on another side of the rotary drive member. The ring is rotatable in response to hub loads in the first and second tensioner pulleys that result from engagement with the first and second spans of the endless drive member.

What is needed is a tensioner having a rotary arm defining a slot for receiving a first pulley fastener whereby a first pulley position is adjustable. The present invention meets this need.

SUMMARY OF THE INVENTION

The primary aspect of the invention is to provide a tensioner having a rotary arm defining a slot for receiving a first pulley fastener whereby a first pulley position is adjustable.

Other aspects of the invention will be pointed out or made obvious by the following description of the invention and the accompanying drawings.

The invention comprises a tensioner comprising a base defining a hole, the hole having a center C, the hole having a diameter sufficient to receive a driven pulley, a rotary arm engaged with the base by a retaining member connected to the base, the rotary arm rotatable about the center C, a pivot arm mounted to the rotary arm on a pivot, the pivot offset from center C, a first pulley journalled to the rotary arm, a second pulley journalled to the pivot arm, a torsion spring engaged between the rotary arm and the pivot arm for biasing the second pulley toward the first pulley, a damping member frictionally engaged between the base and the rotary arm, and the rotary arm defining a portion for receiving a first pulley fastener whereby a first pulley position is adjustable.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1A:
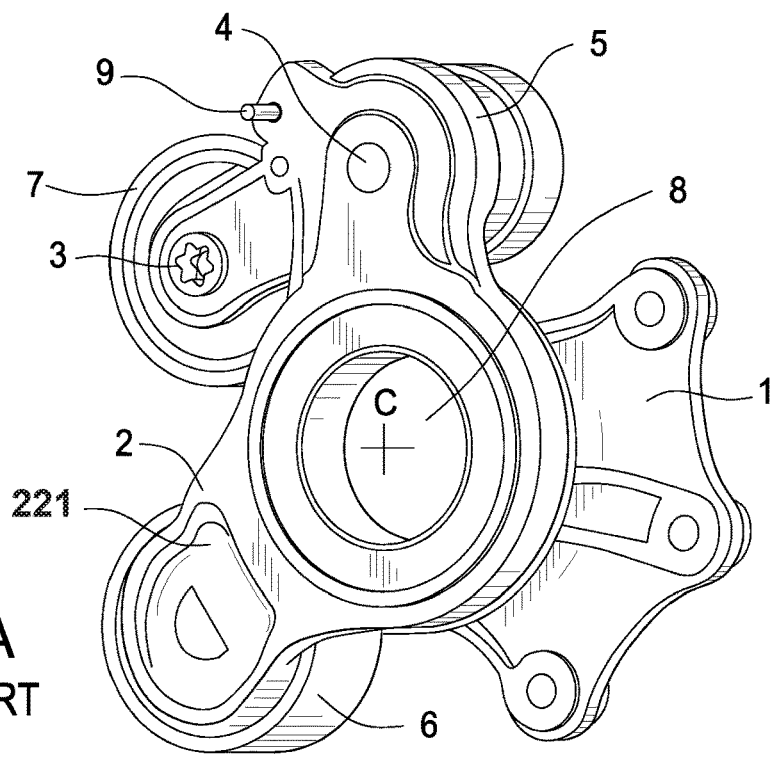
FIG. 1a is the prior art.
Figure 1B:
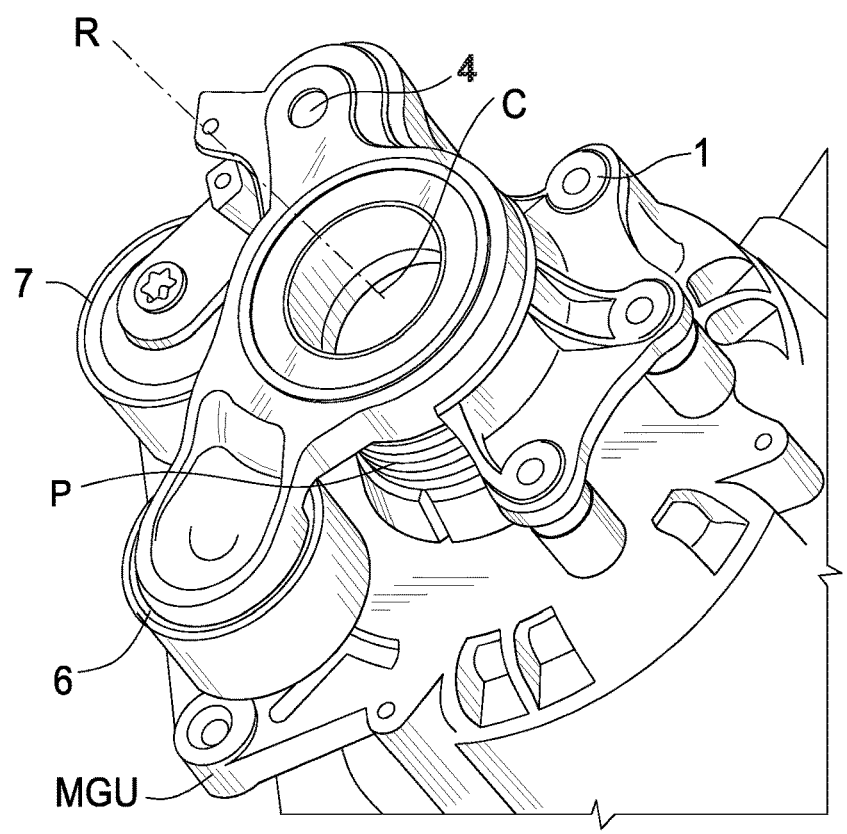
FIG. 1b is the prior art.

FIG. 1 is the prior art. An orbital style tensioner comprises a base 1. Rotary arm 2 is rotationally mounted to base 1. Pulley 6 is journalled to rotary arm 2. A pivot arm 3 is mounted to rotary arm 2 at a pivot 4. Installation pin 9 locks pivot arm 3 during installation. Pulley 7 is journalled to an end of pivot arm 3. Rotary arm 2 rotates about a center C. Base 1 and rotary arm 2 each define a hole 8. Center C is disposed in hole 8 and is coaxially aligned with an MGU pulley axis of rotation R, see FIG. 2. Torsion spring 5 applies a biasing force to rotary arm 2 and pivot arm 3, which in turn applies a load to a belt, see FIG. 9. Pivot 4 is radially offset from center C.

Figure 2:
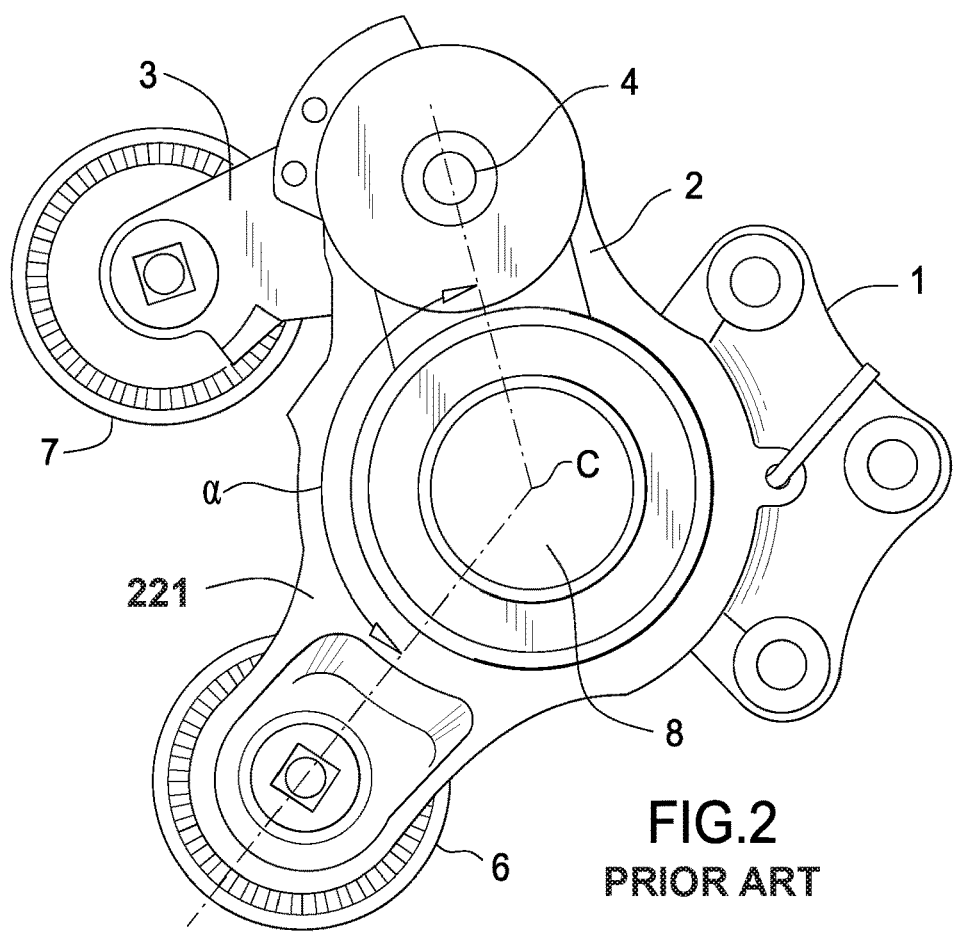
FIG. 2 is the prior art.

FIG. 2 is the prior art. Base 1 is fixed to a motor-generator unit (MGU) by fasteners or other known means. MGU's are used in vehicle engine stop-start applications. Angle α between pivot 4 and arm pulley 6 is 130° in this example.

Figure 3A:
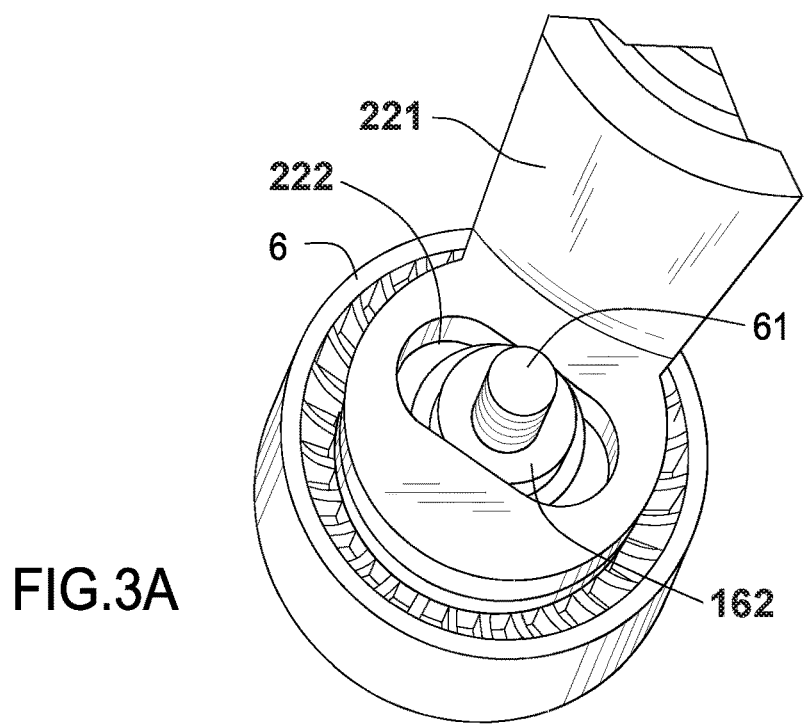
FIG. 3a is a detail of the rotary arm.

FIG. 3a is a detail of the rotary arm. Angle α is adjustable to compensate for length changes of the belt and drive, see FIG. 9. Pulley 6 is mounted to rotary arm portion 221 with a fastener 61. Fastener 61 engages slot 222. Spacer 162 locates fastener 61 in slot 222. Rotary arm portion 221 extends radially from rotary arm center C. A radial length of portion 221 may be short which places pulley 6 on a minimum radius of the rotary arm, or it may be of any suitable radial length as may be required by a system.

Fastener 61 is moveable within slot 222 thereby allowing adjustment of the relative position of pulley 6 on portion 221. Movement of fastener 61, and thereby pulley 6, allows adjustment of angle α over a wide range of several degrees for compensating belt/drive length tolerances. Fastener 61 is fixed in place by locknut 62, see FIG. 3b.

Figure 3B:
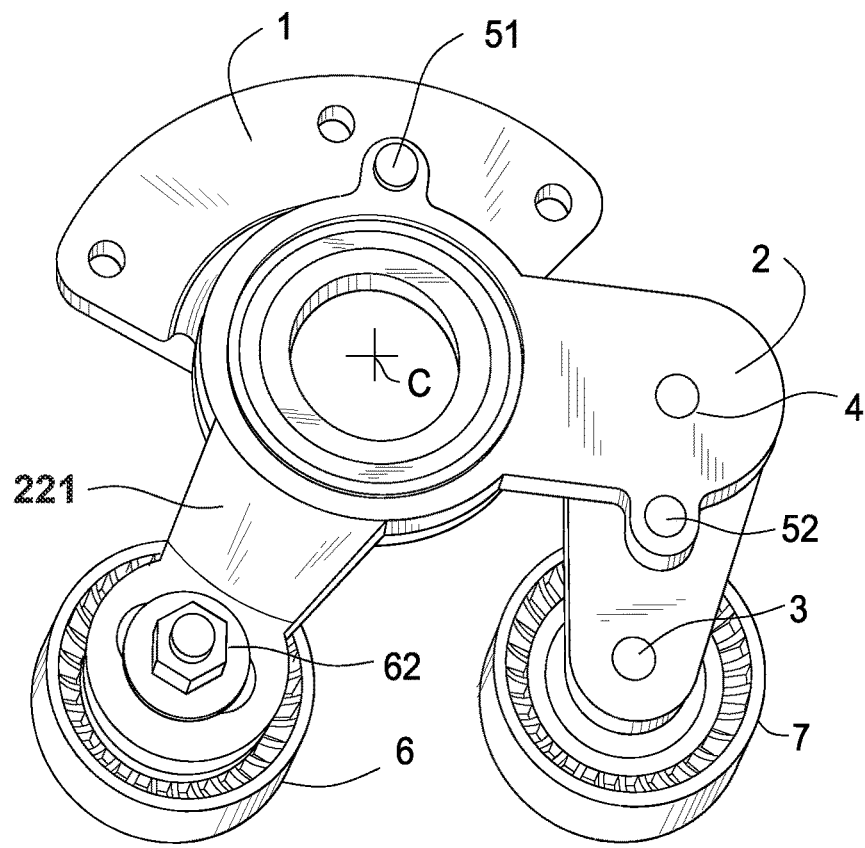
FIG. 3b is a perspective view of the tensioner.

FIG. 3b is a perspective view of the tensioner. Location pin 51 and location pin 52 are each used to temporarily fix a relative position of the base, arm and pivot arm. Location pin 51 engages between base 1 and rotary arm 2 thereby locking a relative position between them. Location pin 52 engages between rotary arm 2 and pivot arm 3 thereby locking a relative position between them.

Figure 9:
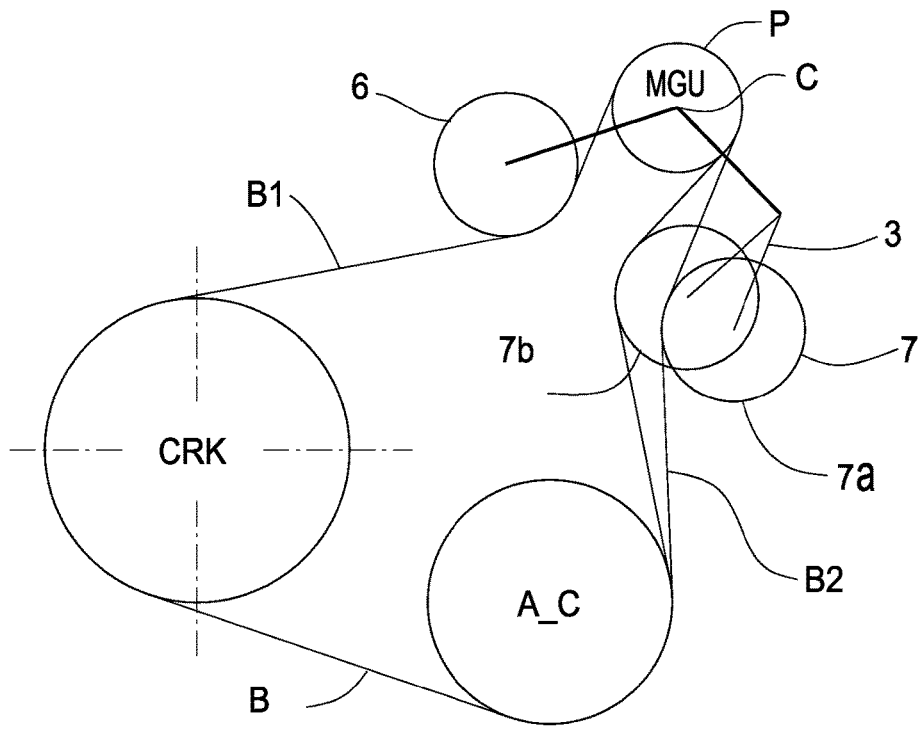
FIG. 9 is a schematic view of a belt drive system.

During manufacture location pins 51, 52 are installed on the tensioner. Once the tensioner is mounted to the MGU and the belt is routed in the system, location pins 51, 52 are removed to allow the tensioner to move to its operating position with the belt. FIG. 9 is a schematic view of a belt drive system.

The instant invention allows adjustment of the location of pulley 6 to accommodate differences in belt and drive length. This reduces or eliminates belt tension changes which can occur due to belt and drive length tolerances. The installation tool described herein provides a means by which adjustment can be quickly and accurately accomplished.

Table A provides an example of tension control with and without the benefit of position adjustment of pulley 6. The invention reduces operational tension change to less than 20% as compared to a system without adjustment. Adjustability reduces power loss which increases fuel savings through reduced belt tension, particularly when used for MGU applications. In Table A, "Belt/drive length" refers to a differential length around a mean overall system belt length. "CA Pos Change" refers to the relative movement of pulley 6 in slot 222 during adjustment. "PA Angle" refers to angle α. "Spring TQ" refers to spring torque of spring 5. "Tension" refers to belt tension. "Wi Adj" refers to with adjustment. "No Adj" refers to no adjustment. In this example the spring torque and belt tension changes are significantly reduced with the adjustable tensioner, thus allowing a lower belt design tension.

TABLE A

| Belt/Drive Length | CA Pos Change | PA angle | Spring TQ [Nm] | | Tension [N] | |
| --- | --- | --- | --- | --- | --- | --- |
| | [deg] | [deg] | No Adj | Wi Adj | No Adj | Wi Adj |
| Mean − 4 mm | 3 | 242 | 16.9 | 15.35 | 405 | 363 |
| Mean | | 245 | 15.3 | 15.3 | 350 | 350 |
| Mean + 4 mm | −3.2 | 248.2 | 13.8 | 15.38 | 301 | 344 |

Figure 4:
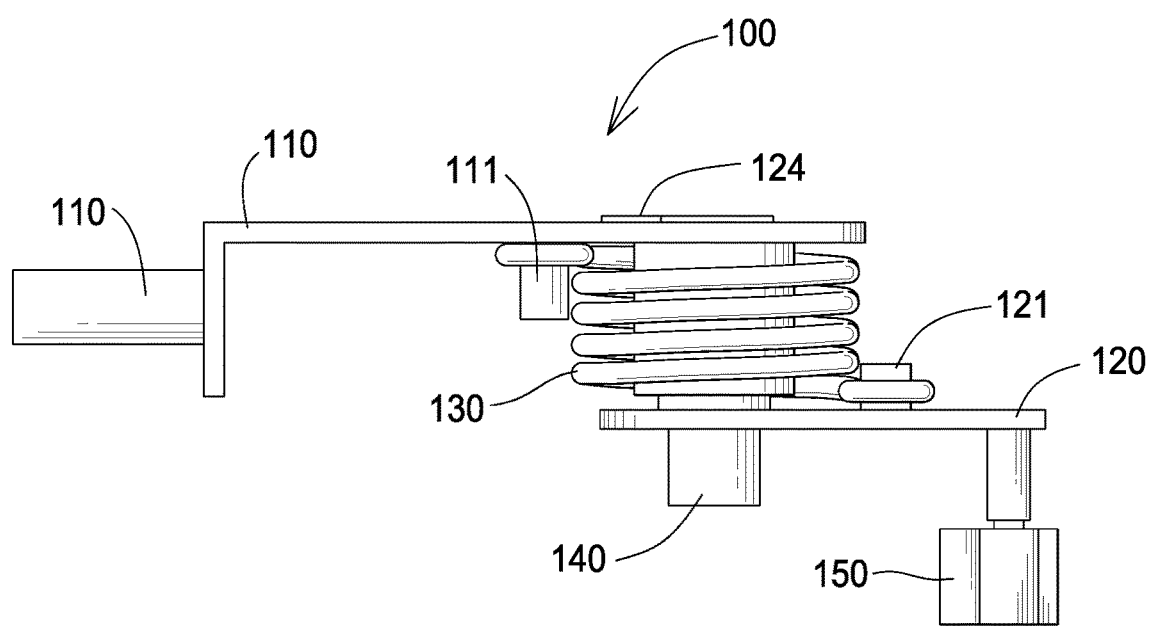
FIG. 4 is a side view of the installation tool.

FIG. 4 is a side view of an installation tool. Installation tool 100 comprises a first lever arm 110 pivotally connected to an adjuster arm 120. Torsion spring 130 is disposed between arm 110 and arm 120. A first end 131 of spring 130 engages pin 111. A second end 132 of spring 130 engages pin 121.

Pilot shaft 140 engages hole 8 in order to stabilize and center the installation tool. Arm 110 and arm 120 pivot coaxially with pilot shaft 140. Portion 150 bears upon pulley 6 during installation.

Figure 5:
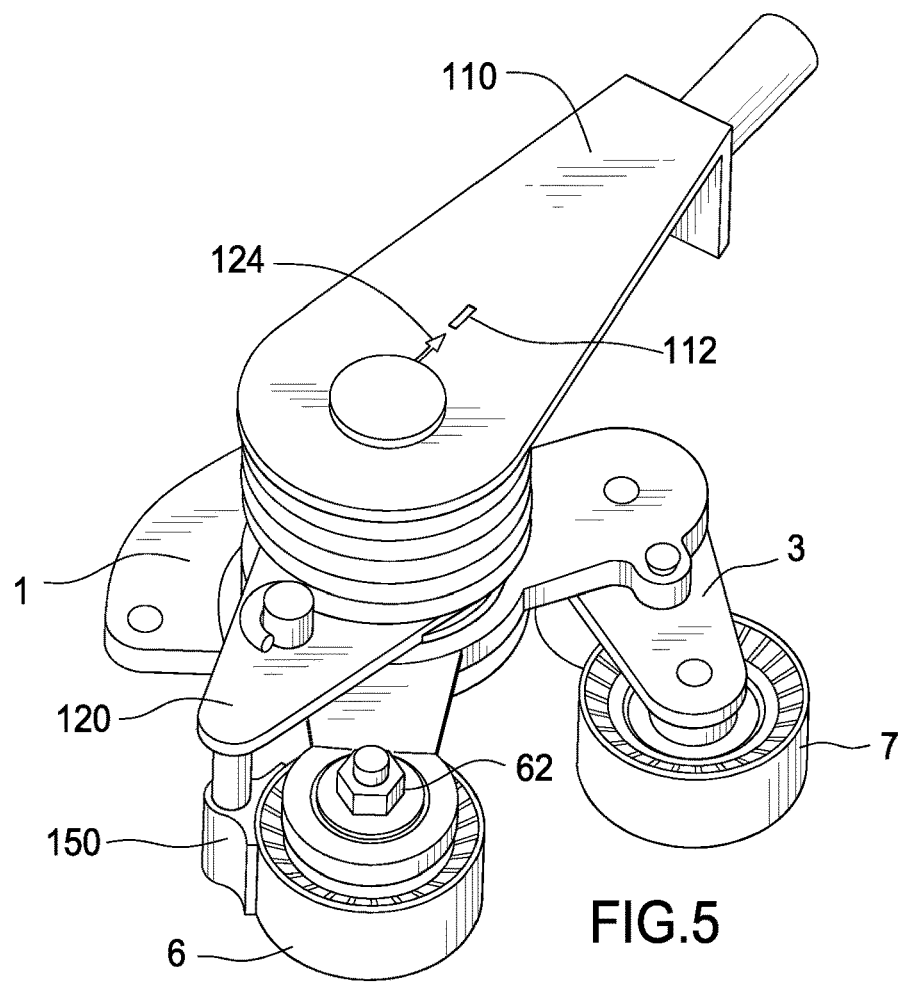
FIG. 5 is a perspective view of the installation tool on the tensioner.

FIG. 5 is a perspective view of the tensioner and installation tool. An index mark 112 is inscribed on arm 110.

Indicator 124 on shaft 122 cooperates with index mark 112 to indicate a proper installation spring load when indicator 124 and index mark 112 are aligned.

Use of the installation tool comprises:
1) Install a belt B routed as per a system layout, for example, see FIG. 9.
2) Install tensioner location pins 51, 52. Pulley 6 is located so that angle α is at a maximum. Fastener 61 is slightly tightened by lock nut 62.
3) Install the tensioner on the MGU. Locate the belt to make a backside engagement with both tensioner pulleys 6, 7. Tighten the mounting bolts to fix the tensioner to the MGU.
4) Position the installation tool on by inserting pilot shaft 140 into hole 8 of the tensioner. Portion 150 engages pulley 6 with spring 130 at its initial load.
5) Rotate arm 110 to align indicator 124 with index mark 112 to apply a predetermined force from loaded spring 130, and thereby to pulley 6, against belt B.
6) Tighten the lock nut 62. Remove the installation tool and remove the location pins 51, 52. The belt is now tensioned at or near the designed nominal tension. Angle α is now adjusted to its proper operating position corresponding to the design belt drive length.

A method for installing a tensioner comprising installing a location pin between a base and a rotary arm and a location pin between a rotary arm and a pivot arm, all on a tensioner, maximizing an angle α between a first tensioner pulley and a pivot arm pivot, installing a belt in a belt drive system, engaging the belt with the first tensioner pulley and a second tensioner pulley, installing the tensioner on a driven device, positioning an installation tool by inserting a pilot shaft into a hole in the tensioner, engaging an installation tool portion with the first tensioner pulley, rotating a first installation tool arm to align an indicator on the first installation tool arm with an index mark on a second installation tool arm thereby applying a predetermined force from a torsion spring to the first tensioner pulley and thereby apply a load to the belt, and fixing the first tensioner pulley in position on the rotary arm.

Figure 6:
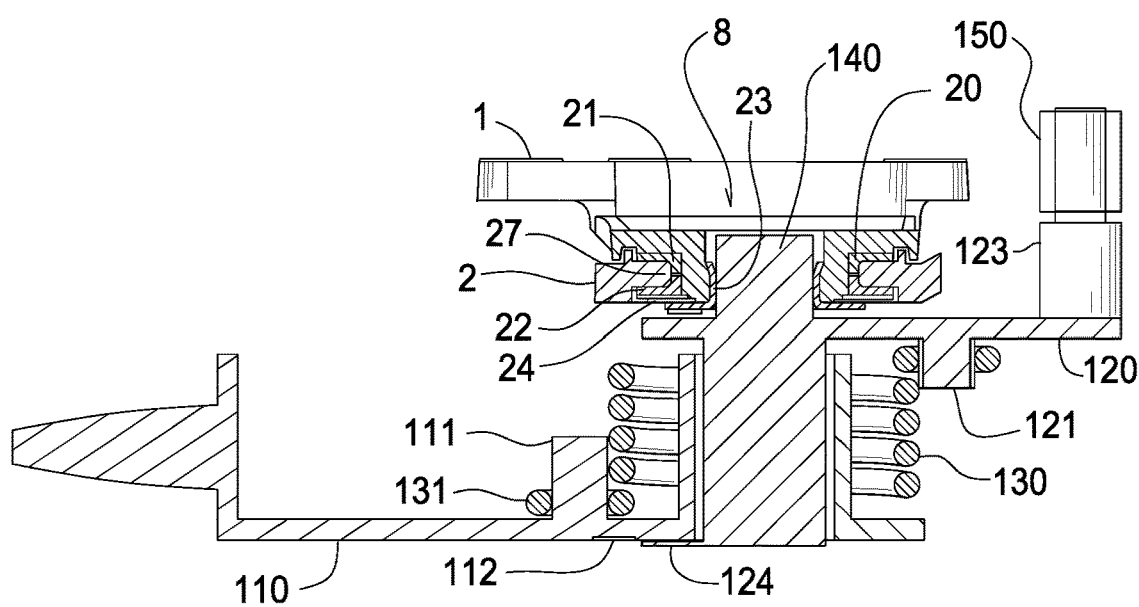
FIG. 6 is a cross section view of the installation tool engaged with the tensioner.

FIG. 6 is a cross section view of the installation tool engaged with the tensioner. The tensioner comprises base 1 and rotary arm 2. Base 1 comprises a receiving portion 20. Disposed within receiving portion 20 are damping member 21 and damping member 22. Damping member 21, 22 are each annular in form and are disposed radially outward from hole 8. Damping member 21, 22 frictionally engage rotary arm 2 to damp oscillations of rotary arm 2.

Rotary arm 2 comprises an annular portion 27. Damping members 21, 22 frictionally engage the annular portion. Retaining member 24 is attached to cylindrical member 23. Member 23 is fixedly connected into hole 8 of base 1, for example by a press fit. Rotary arm 2 is retained to base 1 by member 23 and member 24.

When the installation tool is in use, pilot shaft 140 is inserted into hole 8 of base 1. Portion 150 engages pulley 6.

Figure 7:
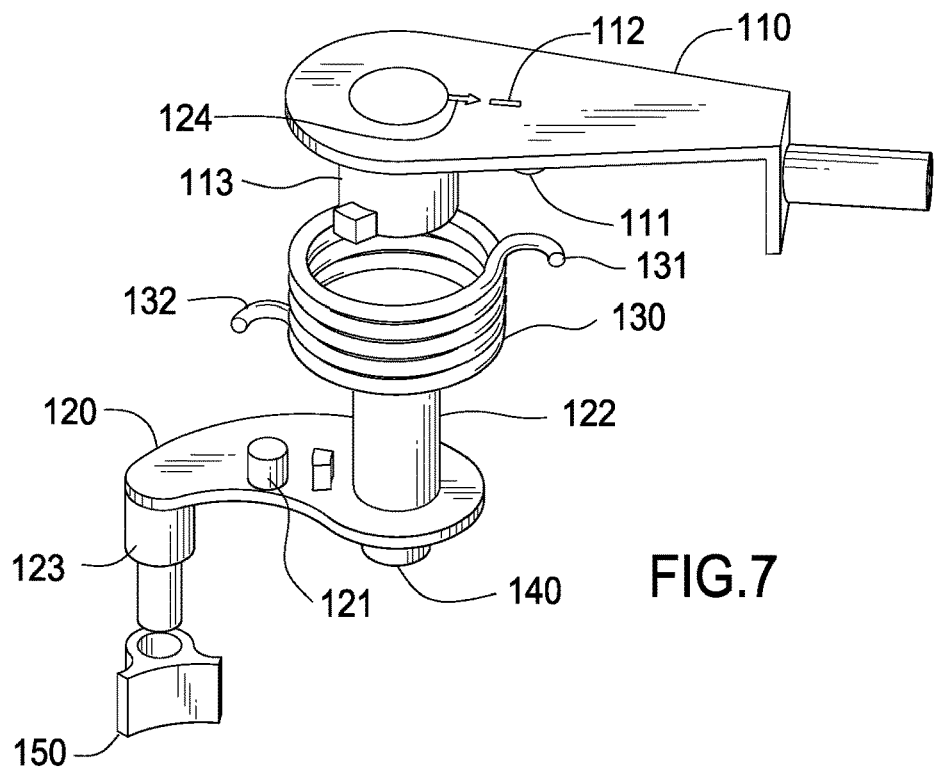
FIG. 7 is an exploded view of the installation tool.

FIG. 7 is an exploded view of the installation tool. Shaft 113 coaxially engages shaft 122. Portion 150 may pivot about shaft 123. Shaft 123 extends from arm 120. Shaft 123, shaft 122, shaft 113 are parallel to each other. Shafts 113 and 122 are coaxial along axis A-A.

Figure 8:
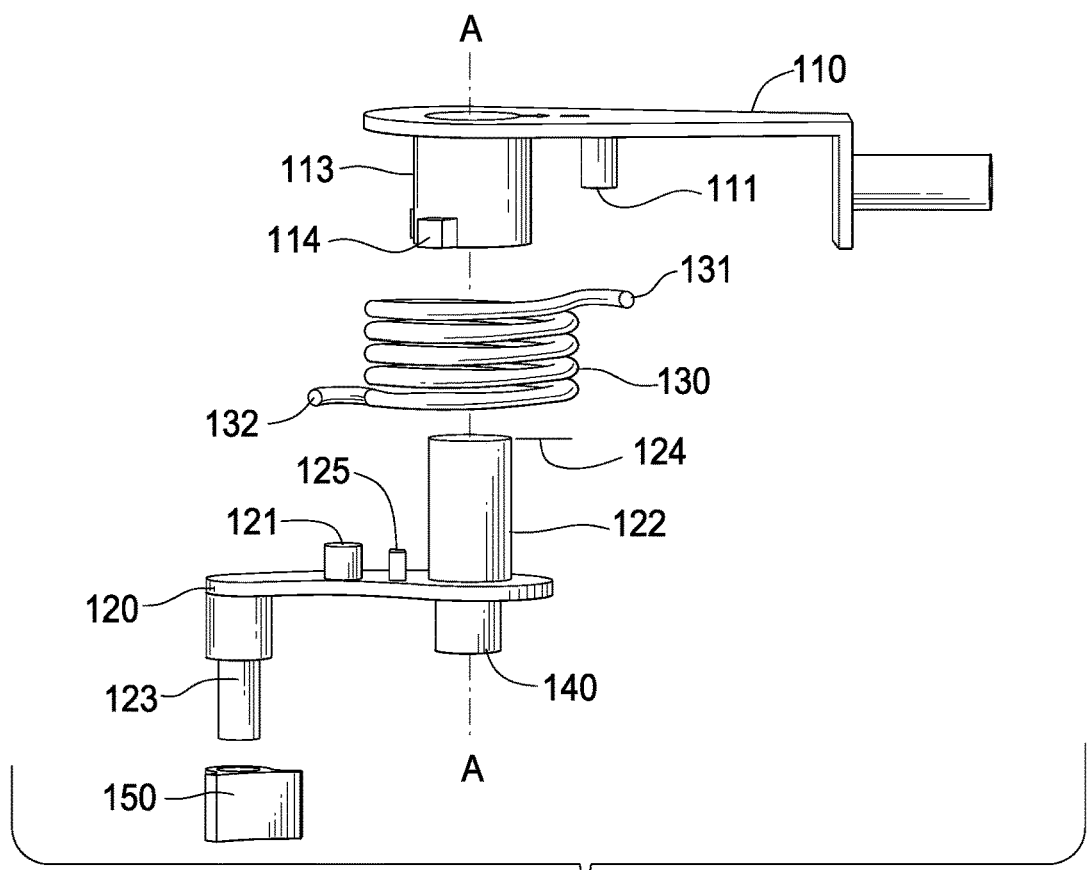
FIG. 8 is an exploded view of the installation tool.

FIG. 8 is an exploded view of the installation tool. Shaft 122 is coaxially engaged within shaft 113. Shaft 122 has an outside diameter that is less than an inside diameter of shaft 113. Stop 114 engages stop 125 in order to prevent over-rotation of arm 110.

A installation tool comprising a first arm, a second arm pivotally connected to the first arm, a torsion spring engaged between the first arm and the second arm to apply a bias force to the first arm and second arm, a portion extending from the second arm for engaging a tensioner pulley, a pilot shaft for engaging a tensioner hole, the first arm and the second arm are coaxial with the pilot shaft, and an indicator on the second arm disposed to cooperate with an index mark on the first arm to indicate a tensioner installation condition.

FIG. 9 is a schematic view of a belt drive system. Belt B is routed among various accessory system components including an air conditioner compressor (A_C) and a motor generator unit (MGU). The system is driven by an engine crankshaft (CRK).

Pulley 6 and pulley 7 each engage a backside of belt B. In a first driving mode the crankshaft drives the components. The MGU operates as a generator providing electrical power to vehicle systems. In the first driving mode belt span B1 is the "tight side" and span B2 is the "slack side".

In start stop mode the engine stops when certain operating conditions are satisfied, for example, when stopped at a stop light with the brakes applied. In this mode the engine remains stopped until a driver input signal is received, for example upon pressing the accelerator pedal. The driver input signal causes the MGU to operate as a starter, thereby starting the engine via power transmitted by the belt to the crankshaft.

Pivot arm 3 and rotary arm 2 each pivot during operation of the system. Pulley 7 is in position 7a when the MGU is start stop mode, particularly in start mode. Pulley 7 is in position 7b when the MGU is operating as a generator. Movement of pivot arm 3 is in conjunction with a rotary movement of rotary arm 2. The combined movement of rotary arm 2 and pivot arm 3 controls the behavior of each belt span B1, B2 on each side of the MGU, thereby reducing belt wear while enhancing efficiency of the system. In stop start mode belt span B1 is the "slack side" and belt span B2 is the "tight side".

Figure 10:
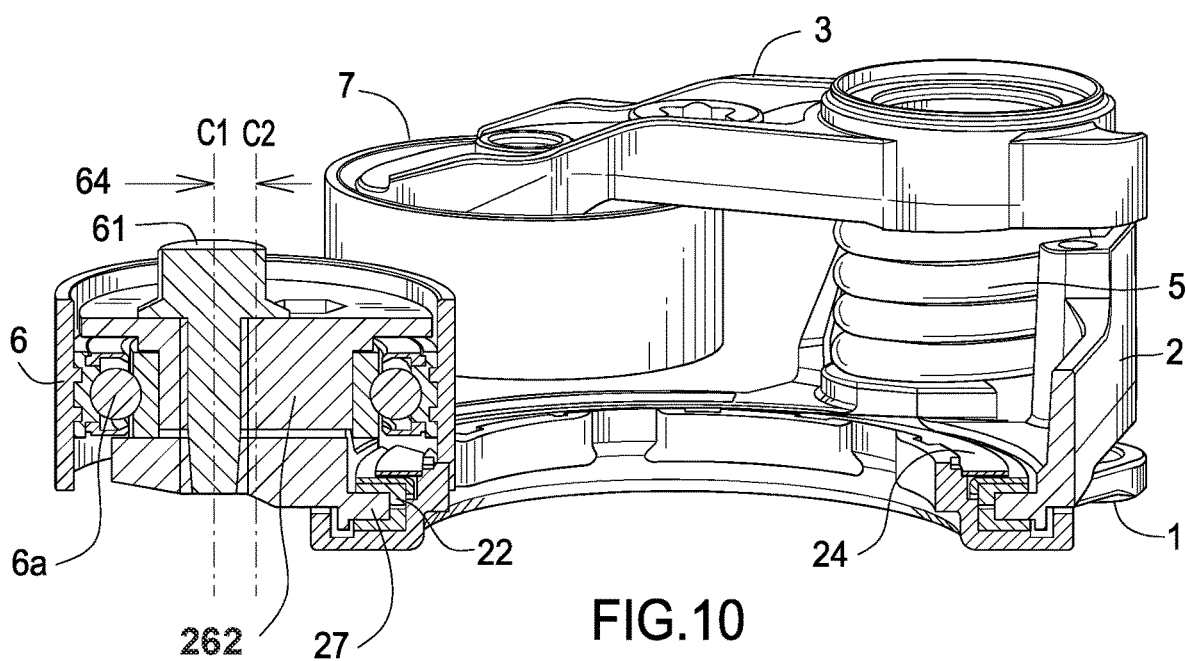
FIG. 10 is a cross section view of an alternate embodiment.

FIG. 10 is a cross section view of an alternate embodiment. Eccentric member 262 is fixed to rotary arm 2 by fastener 61. The center of rotation (C2) of pulley 6 is offset from the center of rotation (C1) of eccentric member 262 by a dimension 64. Adjustment of the position of pulley 6 is accomplished by loosely installing the belt with the tensioner as described herein. Fastener 61 is loosened so that eccentric member 262, and thereby pulley 6, is rotated into contact with the belt by use of a tool engaged with receiving portion 63. Once eccentric member 262 is in its final position fastener 61 is secured to rotary arm 2. An ordinary ratchet wrench can be used as the tool to engage portion 63. Fastener 61 is threaded.

Figure 11:
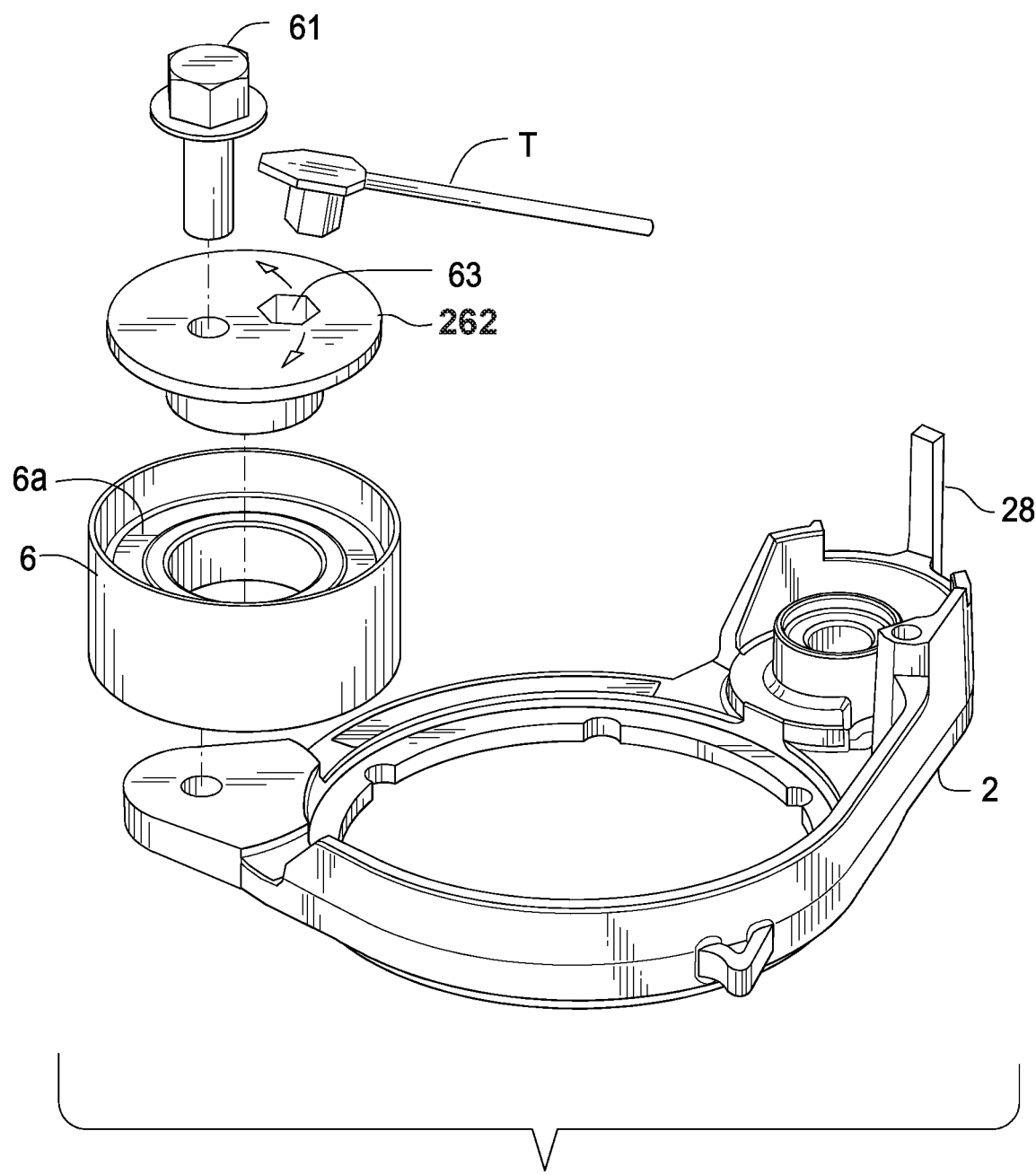
FIG. 11 is an exploded view of the alternate embodiment in FIG. 10.

FIG. 11 is an exploded view of the alternate embodiment in FIG. 10. Pulley 6 is journalled to eccentric member 262 by a known form of bearing 6a, for example, ball, sleeve, bushing, or roller. Eccentric member 262 comprises a receiving portion 63 engagable with a tool T to adjust an eccentric member position.

Indicator 28 extends from rotary arm 2 to cooperate with pivot arm 3. Indicator 28 is used to indicate a predetermined or relative position of the pivot arm 3 with respect to the rotary arm 2. A predetermined position of pivot arm 3 can be used to correlate a predetermined belt load during installation. Indicator 28 can also provide a reference point for pivot arm 3 as part of the position adjustment of eccentric member 262.

Although forms of the invention have been described herein, it will be obvious to those skilled in the art that variations may be made in the construction and relation of parts and method without departing from the spirit and scope of the invention described herein.

We claim:
1. A tensioner comprising:
a base defining a hole, the hole having a center (C), the hole having a diameter sufficient to receive a driven pulley;
a rotary arm engaged with the base by a retaining member connected to the base, the rotary arm rotatable about the center (C);
a pivot arm mounted to the rotary arm on a pivot, the pivot offset from the center (C);
a first pulley journalled to the rotary arm;
a second pulley journalled to the pivot arm;
a torsion spring engaged between the rotary arm and the pivot arm for biasing the second pulley toward the first pulley;
a damping member frictionally engaged between the base and the rotary arm;
wherein the damping member comprises a first annular member and a second annular member; and the rotary arm defining a portion for receiving a first pulley fastener whereby a first pulley position on the rotary arm is adjustable; wherein the rotary arm further comprises an indicator extending from the rotary arm and cooperatively disposed with the pivot arm to indicate a pivot arm position.
2. The tensioner as in claim 1 further comprising:
a first lock pin for fixing a relative position of the base and the rotary arm; and
a second lock pin for fixing a relative position of the rotary arm and the pivot arm.
3. The tensioner as in claim 1, wherein the portion comprises a slot.
4. The tensioner as in claim 1 further comprising:
an eccentric member adjustably fastened to the rotary arm, the first pulley journalled to the eccentric member; and
an eccentric member center of rotation is offset from a center of rotation of the first pulley.
5. The tensioner as in claim 4, wherein the eccentric member comprises a receiving portion engagable with a tool to adjust an eccentric member position.
6. The tensioner as in claim 1, wherein:
the driven pulley has an axis of rotation (R); and
axis of rotation (R) aligns with the center (C).

\* \* \* \* \*